(12) United States Patent
Taylor (10) Patent No.: US 11,772,410 B1
(45) Date of Patent: *Oct. 3, 2023

(54) ERASABLE WRITABLE MATERIALS

(71) Applicant: Kelly J. Taylor, Long Beach, CA (US)

(72) Inventor: Kelly J. Taylor, Long Beach, CA (US)

( * ) Notice: Subject to any disclaimer, the term of this patent is extended or adjusted under 35 U.S.C. 154(b) by 138 days.

This patent is subject to a terminal disclaimer.

(21) Appl. No.: 17/333,636

(22) Filed: May 28, 2021

Related U.S. Application Data (63) Continuation of application No. 16/817,472, filed on Mar. 12, 2020, now Pat. No. 11,021,004, which is a continuation of application No. 16/364,824, filed on Mar. 26, 2019, now Pat. No. 10,589,565, which is a continuation-in-part of application No. 15/992,949, filed on May 30, 2018, now Pat. No. 10,596,847, and a continuation-in-part of application No. 15/721,398, filed on Sep. 29, 2017, now Pat. No. 10,011,142, (Continued)

(51) Int. Cl.
| | |
|---|---|
| *B43L 1/00* | (2006.01) |
| *B32B 3/30* | (2006.01) |
| *B32B 7/06* | (2019.01) |
| *B32B 7/12* | (2006.01) |
| *B32B 27/30* | (2006.01) |
| *B32B 27/36* | (2006.01) |
| *B32B 27/08* | (2006.01) |

(52) U.S. Cl.
CPC ............... *B43L 1/002* (2013.01); *B32B 3/30* (2013.01); *B32B 7/06* (2013.01); *B32B 7/12* (2013.01); *B32B 27/08* (2013.01); *B32B 27/304* (2013.01); *B32B 27/36* (2013.01); *B32B 2307/412* (2013.01); *B32B 2307/536* (2013.01)

(58) Field of Classification Search
CPC ............... B43L 1/00; B43L 1/008; B43L 1/06
USPC ........ 434/408, 416, 421, 425; 156/290, 295; 428/353, 354
See application file for complete search history.

(56) References Cited

U.S. PATENT DOCUMENTS

| | | |
|---|---|---|
| 3,029,157 A | 4/1962 | Sutheim et al. |
| 3,810,840 A | 5/1974 | Van Ruler et al. |
| (Continued) | | |

OTHER PUBLICATIONS

USPTO Office Action dated May 16, 2019, in related U.S. Appl. No. 15/448,658, filed Mar. 3, 2017, which Includes Cited References.

(Continued)

*Primary Examiner* — Kurt Fernstrom
(74) *Attorney, Agent, or Firm* — BUCHALTER (57) ABSTRACT

A magnetic erasable writable material for large format applications is disclosed, and includes a cast polyvinylchloride film with a mount surface opposite an etched receiver surface. Also incorporated is a transparent polyester film that has a marking side with a first predetermined hardness and an opposite seal side, laminated to the receiver surface. The marking side includes a clear superstrate that has a second predetermined hardness and applied to the marking side of the polyester film to lower its surface energy. The receiver surface is treated to have a surface energy adjusted to enable improved adherence of printed and preformed graphic elements, which are encapsulated when laminated between the PET film and receiver surface. The superstrate includes a perfluoropolyether, a polyurethane, an acrylated polyurethane, and/or an acrylate resin to harden the material.

20 Claims, 2 Drawing Sheets

Related U.S. Application Data which is a continuation-in-part of application No. 15/448,658, filed on Mar. 3, 2017, now abandoned.

(56) References Cited

U.S. PATENT DOCUMENTS

| | | | |
|---|---|---|---|
| 4,412,929 | A | 11/1983 | Lysenko et al. |
| 4,996,110 | A | 2/1991 | Tanuma et al. |
| 5,200,853 | A | 4/1993 | Berkman |
| 5,278,275 | A | 1/1994 | Yatsuka et al. |
| 6,387,485 | B1 * | 5/2002 | Bielek .................. C09J 7/38 |
| | | | 428/209 |
| 6,464,507 | B1 | 10/2002 | Bailey |
| 6,476,965 | B1 | 11/2002 | He et al. |
| 6,541,098 | B2 * | 4/2003 | Venkatasanthanam ... B32B 3/28 |
| | | | 428/161 |
| 6,620,500 | B2 | 9/2003 | Sweet et al. |
| 6,630,049 | B2 | 10/2003 | Mannington et al. |
| 6,767,591 | B2 | 7/2004 | Meccia et al. |
| 6,881,450 | B1 | 4/2005 | Texier |
| 7,713,375 | B2 | 5/2010 | Schneider |
| 9,028,951 | B2 | 5/2015 | Boudouris et al. |
| 11,021,005 | B1 * | 6/2021 | O'Rourke ............... B43L 1/008 |
| 2003/0152731 | A1 | 8/2003 | Deetz |
| 2004/0081844 | A1 | 4/2004 | Bharti et al. |
| 2005/0186439 | A1 | 8/2005 | Staadecker |
| 2005/0262787 | A1 | 12/2005 | Goss |
| 2006/0147893 | A1 | 7/2006 | Moore et al. |
| 2006/0150454 | A1 | 7/2006 | Kang |
| 2007/0238080 | A1 | 10/2007 | Lynch |
| 2008/0152902 | A1 | 6/2008 | Adler |
| 2009/0211123 | A1 | 8/2009 | Arnold |
| 2009/0298041 | A1 | 12/2009 | Lee |
| 2013/0101979 | A1 | 4/2013 | Shanbour, II |
| 2014/0154661 | A1 | 6/2014 | Bookbinder |
| 2014/0315184 | A1 | 10/2014 | Jorgenson |
| 2015/0104779 | A1 | 4/2015 | Kingston |
| 2015/0239280 | A1 | 8/2015 | Deka |
| 2017/0190155 | A1 | 7/2017 | Gopalakrishnan |
| 2018/0352957 | A1 | 12/2018 | Avallon |

OTHER PUBLICATIONS

USPTO Office Action dated May 22, 2019, in related U.S. Appl. No. 16/364,824, filed Mar. 26, 2019 which Includes Cited References.
USPTO Office Action dated Aug. 13, 2020, in related U.S. Appl. No. 16/817,472, filed Mar. 12, 2020 which Includes Cited References.

* cited by examiner

ERASABLE WRITABLE MATERIALS

CROSS REFERENCE TO RELATED PATENT APPLICATIONS

This application is continuation of co-owned, application entitled "Erasable Writable Materials" of Kelly J. Taylor, Ser. No. 16/817,472 filed Mar. 12, 2020, now U.S. Pat. No. 11,021,004, issued Jun. 1, 2021, which is a continuation of co-owned, application Ser. No. 16/364,824, filed Mar. 26, 2019, now U.S. Pat. No. 10,589,565, issued Mar. 17, 2020, which is a continuation-in-part of co-owned, application Ser. No. 15/992,949, filed May 30, 2018, now U.S. Pat. No. 10,596,847, issued Mar. 24, 2020, and Ser. No. 15/721,398, filed Sep. 29, 2017 and now U.S. Pat. No. 10,011,142, issued Jul. 3, 2018, which is a continuation-in-part of co-owned, application also having the same title and inventor, Ser. No. 15/448,658, filed Mar. 3, 2017, all of which are incorporated by reference herein in their entirety.

TECHNICAL FIELD

The disclosure relates to improved erasable writable magnetic materials configured to enable embedding of graphics, and methods of manufacture, which enable longer life-span, and improved resilience and appearance of such materials in applications that utilize permanent and non-permanent ink and related substances to mark the material.

BACKGROUND

Manufacturers of various types of plastic materials and films have developed many types of "dry erase", erasable, writable, magnetic, and anti-graffiti surfaces and substances for a variety of applications. One application includes what are sometimes referred to as "dry-erase white-boards," which utilize certain materials that are compatible for use with dry erase marking devices and which may be magnetic and written upon and erased without additional chemicals such as cleaning liquids.

Despite many years of development and technology maturation, many such materials and films and applications thereof remain inadequately compatible for use with magnetic elements, and remain susceptible to staining and ghosting when used with permanent and non-permanent marking substances. This has been especially pronounced when such marking substances remain in contact with the plastic materials and films for periods of time that extend beyond a day, a week, and longer time spans.

SUMMARY

Some attempts have been made to improve performance of such materials and films for specific applications, but many opportunities for improvement persist. The disclosure is directed to an improved erasable writable magnetic material that prevents staining and ghosting in new ways, and which is suitable for use in large format applications including, for purposes of example but not for purposes of limitation, new magnetic and erasable writable materials and films for mounting typically on a wall, but also in some configurations also on a floor, and/or a ceiling, and similar types of surfaces.

The contemplated erasable writable material is configured to be flexible, and includes a cast, flexible vinyl and/or polyvinylchloride sheet and/or film substrate or carrier, which may be opaque, translucent, and/or transparent in whole and/or in part, and which is formed with a mount surface and an etched receiver surface on an opposite side of the substrate or carrier, and which enables compatibility for use with magnetic fasteners. The mount surface is configured with an adhesive and/or to receive an adhesive, and to enable mounting to such large format surfaces, such as fixed and movable walls, floors, panels, doors, ceilings, and can also include movable and mobile large format surfaces and others such as billboards, movable room dividers and the like. Either or both of the polyvinylchloride sheet and the mount surface adhesive, or other elements of the material may incorporate unmagnetized ferrimagnetic and/or ferromagnetic material.

The receiver surface is configured, treated, and/or adjusted to be etched or micro-etched and to increase a surface energy thereof to exceed about 38 to about 45 millinewtons per meter (mN/m), which improves the surface receptivity and capability to receive, mount, adhere, and/or carry printable, printed, and preformed graphic elements, such as visual media such as images and/or designs.

In other adaptations, the mount surface adhesive incorporates and/or may incorporate a plurality of air channels that are formed by at least one of striations and/or channels formed integral with or on the mount surface and/or a plurality of frangible hollow pockets, spheres, nodules, and/or other similarly capable elements dispersed throughout the mount surface adhesive, such that the air channels collapse when the mount surface is applied to a large format surface, such as a wall, ceiling, floor, and the like. The collapse of the air channels is and/or may be enabled by the application of pressure and/or heat that causes one or more of the adhesive to fill the channels and/or striations and the hollow spheres or elements to be broken during one or more of the pressure and/or heat application and/or activation.

The magnetic erasable writable material also includes and/or may include a release liner that is affixed to the mount surface adhesive and overlying any air channels, and is configured to be releasable therefrom. The releasability is enabled with the liner being coated with a polyethylene and which is also siliconized to reduce surface energy to approximately between 24 and 33 mN/m. This arrangement enables both adherence of the release liner to the mount surface adhesive, and removal of the release liner without causing degradation to the mount surface adhesive and/or air channels.

A transparent, flexible polyester sheet and/or film is also included, which for example may be formed from a polyethylene terephthalate (PET) film, and which is joined to the substrate or carrier. This polyester film includes a marking side and an opposite seal side. The marking side is configured to have a durometer hardness exceeding approximately 79 on the Shore D scale, which hardness may be incorporated about the entire thickness of the polyester film and/or primarily about the marking side surface. The seal side includes and/or may include an adhesive and is and/or may treated, adjusted, and/or configured to have a surface energy that exceeds approximately 45 mN/m.

The disclosure is directed to other variations of the polyester film including the adhesive applied to the seal side to also be at least one of heat and pressure activated, which enables lamination and joining to the receiver surface utilizing one or more of a predetermined heat, pressure, and rolling lamination speed, such that the graphic elements are hermetically sealed against the receiver surface. In other arrangements, the mount surface further incorporates at least one of a pressure and/or heat activated adhesive, such that the erasable writable material is repositionable during installation onto, upon, and/or against a large format surface, until the adhesive is at least one of cured, dried, and/or pressure, and/or heat activated.

The polyester sheet and/or film is hermetically laminated and joined to the receiver surface of the substrate or carrier cast polyvinyl film. The receiver surface of the carrier or substrate is configured, adjusted, and/or treated to have a surface energy exceeding about 45 mN/m, which enables improved adherence and retention of the graphic elements, which elements are encapsulated when laminated between the seal side of the polyester film and the receiver surface of the substrate or carrier vinyl or polyvinyl film.

The marking side of the polyester film further includes, incorporates, formed with or by, is coated with, and/or is joined to a clear superstrate, which is treated, selected, and/or configured to have a hardness that approximately exceeds a durometer of 80 on the Shore D scale, or higher such as about 88, 90, and/or 95. The superstrate is applied to the marking side of the polyester and/or PET film, and when so applied lowers a surface energy of the marking side to be approximately between 15 and 30 mN/m, and/or below about 24 mN/m.

In additional modifications to the erasable writable material of the disclosure, the polyester film, such as the PET film, is configured to have a thickness of approximately 50 micromillimeters or microns, which in addition to the chemistry and formulation of the film enables the hardness to exceed a durometer measured hardness of 79 on the Shore D durometer scale.

The superstrate includes at least one of and/or one or more of a perfluoropolyether, a polyurethane, an acrylated polyurethane, and/or an acrylate resin that is hardenable and/or may be hardened, as well as a photoinitiator that is responsive to ultraviolet radiation to enable curing and hardening of the superstrate after application to, incorporation with, coating of, and/or joining of the superstrate to the marking side of the polyester film. The superstrate incorporates such materials to enable further hardening of the marking side, and is configured, treated, adjusted, and/or modified to have a durometer hardness exceeding approximately 80 to 95 on the Shore D scale.

In further variations of the disclosure, the superstrate is applied, configured, adjusted, and/or modified to have a thickness, when applied, adhered, and/or joined to the marking side of the polyester film, of approximately between 2 and 5 microns, which in combination with the selection, adjustment, configuration, and/or formulation of the superstrate material(s), enables the desired durometer hardness of the marking side of about shore D 88, 90, and/or 95

The disclosure also contemplates the superstrate configured, selected, adjusted, modified, and/or formulated, when joined to the polyester film, to have a maximum optical light transmission and minimum optical haze, and more particularly for purposes of example without limitation, to have a visible light transmission of greater than about 90% of the visible light that is incident upon the superstrate. Additionally, for further purposes of example without limitation, the superstrate is also adapted, adjusted, configured, and/or formulated to have a haze, or wide angle light scattering or diffusive effect that does not exceed about 0.6%, as determined by various standard test methods described elsewhere herein.

Methods of manufacturing the erasable writable magnetic material are also contemplated, and include, for example, providing a cast and/or calendared vinyl and/or polyvinyl-chloride film with a mount surface opposite an etched receiver surface, and laminating to the receiver surface, a seal side of a transparent polyethylene terephthalate film that includes an opposite marking side that has a hardness exceeding approximately shore D 79. Additionally, treating, formulating, configuring, adjusting, and/or modifying the marking side is also included, such that a hardness exceeding approximately shore D 90 is enabled, and a surface energy of the marking side is lowered below about 24 millinewtons per meter by applying a clear superstrate.

Further variations of the methods incorporate configuring the polyethylene terephthalate film to have a thickness of approximately 50 microns that combined with the formulation enables the hardness exceeding about shore D 79, and configuring the superstrate to have a thickness of approximately between 2 and 5 microns to enable the approximately greater than shore D 80 hardness, and such that marking side surface energy is reduced, adjusted, configured, and/or lowered to approximately between 15 and 30 mN/m to increase fugitivity of and prevent ghosting and staining by applied non-permanent and permanent marking substances.

In other arrangements of the methods, configuring the superstrate includes incorporating an ultraviolet radiation responsive photoinitiator, and at least one of a perfluoropolyether, a polyurethane, an acrylated polyurethane, and an acrylate resin, and irradiating the photoinitiator with ultraviolet radiation to harden the superstrate. Further contemplated by the methods is treating the polyvinylchloride film configured to have a receiver surface energy increased to exceed approximately 38 millinewtons per meter to increase adherence of one or more of printed and preformed graphic elements. At least one of printing and positioning the graphic elements is also included, to be hermetically sealed between the receiver surface of the polyvinylchloride film and the seal side of the polyethylene terephthalate film.

The methods of the disclosure also incorporate applying an adhesive to the seal side of the polyethylene terephthalate film to enable hermetic lamination to the receiver surface utilizing one or more of a predetermined heat, pressure, and rolling lamination speed. This variation may further include forming the superstrate to include an ultraviolet radiation responsive photoinitiator, and one or more of a polyurethane, acrylated polyurethane, acrylate resin, and perfluoropolyether, which enables the hardness and reduced surface energy when irradiated with the ultraviolet radiation.

This summary of the implementations and configurations of the materials and described elements, components, and constituents introduces a selection of exemplary implementations, configurations, and arrangements, in a simplified and less technically detailed arrangement, and such are further described in more detail below in the detailed description in connection with the accompanying illustrations and drawings, and the claims that follow.

This summary is not intended to identify key features or essential features of the claimed technology, and it is not intended to be used as an aid in determining the scope of the claimed subject matter. The features, functions, capabilities, and advantages discussed here may be achieved independently in various example implementations or may be combined in yet other example arrangements, as further described elsewhere herein, and which may also be understood by those skilled and knowledgeable in the relevant fields of technology, with reference to the following description and drawings.

BRIEF DESCRIPTION OF THE DRAWINGS

A more complete understanding of example implementations of the present disclosure may be derived by referring to the detailed description and claims when considered with the following figures, wherein like reference numbers refer to similar or identical elements throughout the figures. The figures and annotations thereon are provided to facilitate understanding of the disclosure without limiting the breadth, scope, scale, or applicability of the disclosure. The drawings are not necessarily made to scale.

DETAILED DESCRIPTION

As required, detailed embodiments of the present invention are disclosed herein; however, it is to be understood that the disclosed embodiments are merely exemplary of the invention that may be embodied in various and alternative forms. As noted elsewhere, the figures are not necessarily to scale, and some features may be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art should understand, various features, components, and processes illustrated and described with reference to any one of the figures may be combined with features, components, and processes illustrated in one or more other figures to enable embodiments that should be apparent to those skilled in the art, but which may not be explicitly illustrated or described. The combinations of features illustrated are representative embodiments for typical applications. Various combinations and modifications of the features consistent with the teachings of this disclosure, however, could be desired for particular applications or implementations, and should be readily within the knowledge, skill, and ability of those working in the relevant fields of technology.

Figure 1:
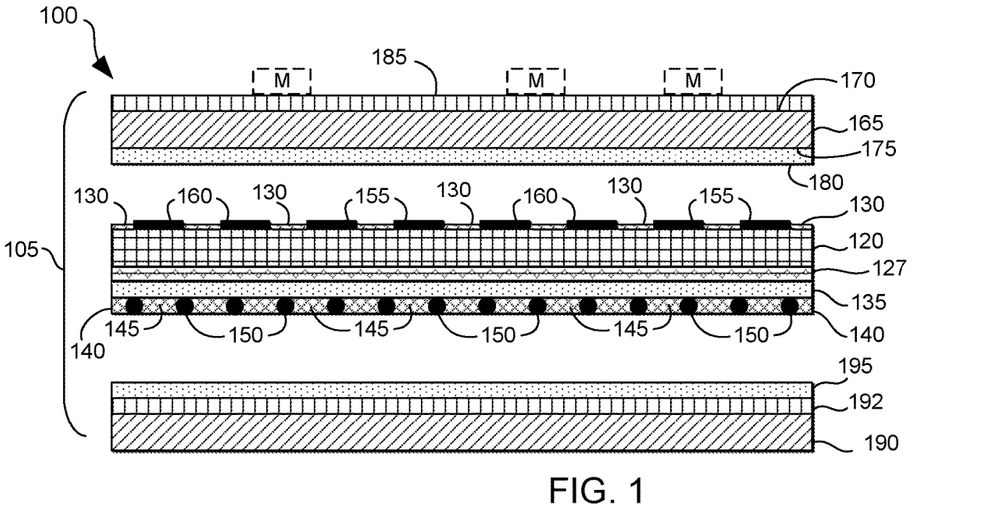
FIG. 1 is an illustration of an erasable writable material and its constituents, elements, components, and arrangements.
Figure 2:
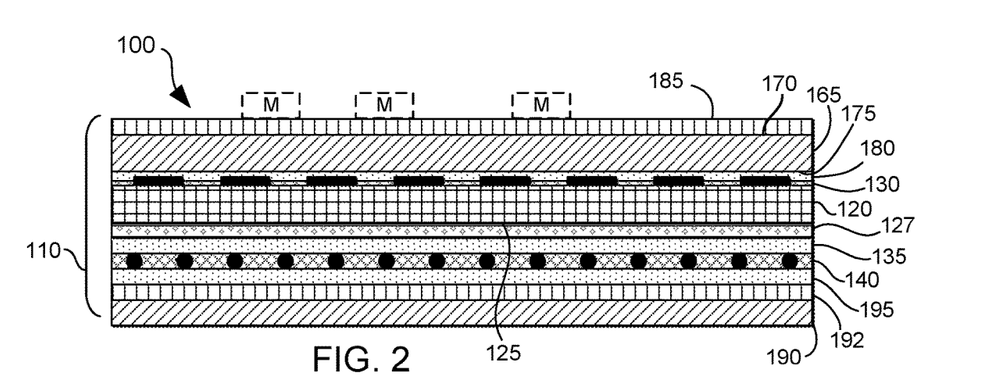
FIG. 2 illustrates certain aspects of the disclosure depicted in FIG. 1, with components removed and rearranged for purposes of illustration.

With reference now to the various figures and illustrations and to FIGS. 1 and 2, and specifically to FIG. 1, a schematic diagram of an unassembled arrangement of the materials and constituents of the disclosure is depicted. An erasable writable material is denoted with reference numeral 100 and is shown unassembled in a schematically illustrated, exploded arrangement 105, which enables an exemplary illustration of the constituent materials and elements of erasable writable material 100.

Figure 3:
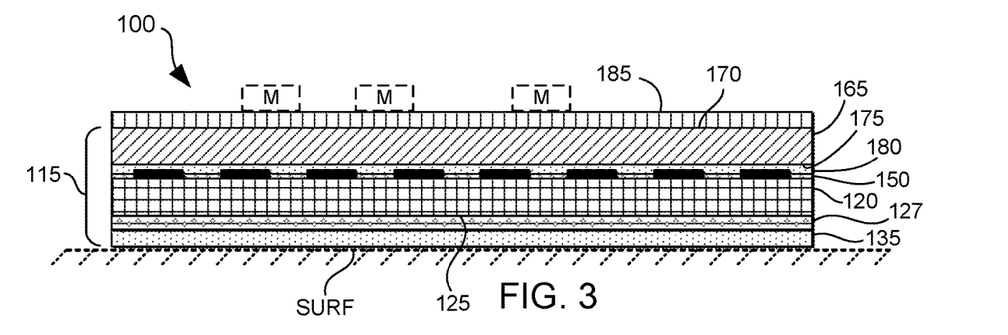
FIG. 3 depicts the erasable writable material mounted about a representative surface.

FIG. 2 reflects an assembled arrangement 110 of the erasable writable material 100, while FIG. 3 represents an example of the fabricated erasable writable material 100 in a particular arrangement and application shown as reference numeral and bracket 115, as material 100 is applied, installed, mounted, and/or attached to a large format surface SURF, which may be for purposes of illustration but not limitation, fixed or moveable or mobile walls, room and space dividers, panels, doors, ceilings, floors, billboards, large panel and cargo truck side walls, and similar surfaces. For purposes of further illustration, the phrase large format as used in this disclosure refers to both large format printing and printed material 100 that exceeds about 24 inches by about 36 inches, or more, such that material 100 is fabricated to entirely cover large surfaces as described above and elsewhere herein.

With continuing reference to FIG. 1, magnetic erasable writable material is a flexible sheet or film, and for further example without limitation, includes and/or may include a cast or calendared, flexible vinyl, polyvinyl, and/or polyvinylchloride (PVC) sheet and/or film substrate or carrier 120. For applications requiring increased durability and at sometimes increased cost, a cast polyvinyl may be utilized, while a calendared polyvinyl may be utilized for applications requiring lower costs and decreased lifespan and durability. However, recent technological advances in cast and calendared polyvinyl materials have blurred the distinctions between cost and durability to establish substantial improvements in performance and reductions in cost for both methods of manufacturing. The sheet or film carrier or substrate 120 is or may be entirely and/or partially opaque, translucent, and/or transparent as may be desired for particular applications. The vinyl or PVC film or sheet 120 is formed to be substantially planar and includes a mount surface 125 and an opposite, etched receiver surface 130 on the other side of the film or sheet substrate or carrier 120.

Mount surface 125 incorporates, includes, is formed with, is coated with, and/or is configured with an unmagnetized ferromagnetic and/or ferromagnetic material 127 and a mount surface adhesive 135 and/or to receive or be coated with adhesive 135, which enables adhering, mounting, attachment, and/or application to large format surfaces SURF. The unmagnetized ferromagnetic and/or ferromagnetic material 127 may be formed integrally with PVC film or sheet 120 and/or may, for purposes of examples without limitation, further also or instead be bonded to and/or applied to film or sheet 120 alone, in combination with, in addition to, and/or as part of adhesive 135, and/or as part of other elements of the material 100 as may be suitable and preferred. The material 127 is preferably utilized in an amount that enables material 100 to be receptive to temporary magnetization by permanent magnets such as magnet M (FIG. 3).

Permanent magnets M may be decorative and/or functional magnets M that further enable material 100 to receive and carry other objects that are removably held or fastened onto material 100 by friction created by the force of attraction between magnets M and magnetic erasable writable material 100, such as when material 100 is affixed to SURF. Exemplary magnets M that have been found to suitable for use in fastening items to SURF include neodymium permanent magnets M having a permanent magnetization of between about 10,000 and 13,000 Gauss or higher (1 to 1.3 Tesla or higher), ferrite magnets exceeding 3,500 Gauss or 0.35 Telsa or higher, and similarly high magnetic flux density permanent magnets M, which are selected for compatibility with and according to the construction of the magnetic material 100 as described elsewhere herein.

In various arrangements, unmagnetized and/or degaussed ferromagnetic and/or ferromagnetic material 127 may be formed from magnetically soft materials, having low remanence, low remanent magnetization, low coercivity, and/or low residual magnetization, which can include electric steel and/or iron powder, particles, filings, and/or shavings forming a layer of approximately between one mil (0.0254 millimeters) and 10 mils (0.254 millimeters), and more preferably approximately between 2 mils (0.0508 mm) and 4 mils (0.1016 mm), or thinner or thicker depending upon preferences for flexibility and magnetic permeability. The particles forming material 127 includes, for example without limitation, substantially spherical and/or irregularly shaped particles having an average particle size approximately in the range between 18 mesh (1 millimeter) and 500 mesh (0.025 millimeters), and more preferably approximately between 50 and 170 mesh (about 0.297 mm to 0.088 mm), or larger or smaller and depending upon preferred flexibility and magnetic permeability of material 100.

Other arrangements contemplate utilization of flexible iron foils or thin sheets that may be bonded with and/or applied to film or sheet 120, ranging approximately between one mil (0.0254 millimeters) and 10 mils (0.254 millimeters), and more preferably approximately between 2 mils (0.0508 mm) and 4 mils (0.1016 mm), or thinner or thicker depending upon preferences for flexibility and magnetic permeability of material 100. Those knowledgeable in the relevant fields of art should appreciate that permeability is measured in Henries per meter (H/m), or equivalently in newtons (kgm/s$^2$) per ampere squared (N/A$^2$).

Preferably, the unmagnetized and/or degaussed ferromagnetic and/or ferromagnetic material 127 is formed from iron or another similar material having a permeability of about 0.25 H/m or N/A$^2$, and to be magnetically soft and/or having low coercivity (measured in units of Oersteds, Oe, or kiloamperes/meter, kA/m) of approximately between zero and 2 Oe or kA/m. A number of sources for such particulate, foil, and sheet iron and electric steel include for example American Elements of Los Angeles, Calif., and Sichuan Jinshi Technology Co., Ltd., Sichuan, China, and Jinjiang AoMing Industrial Co., Ltd., Fujian, China, among others.

Such large format surfaces as contemplated by the disclosure are typically substantially larger than about poster sizes of about 24 inches by about 36 inches, such as for example without limitation, an entire interior or exterior wall of a structure or building or vehicle or billboard, and similarly very large surfaces. In some configurations of material 100, mount surface 125 may not include adhesive 135, and may instead be mounted to SURF utilizing another type of adhesive that is applied to either mount surface 125 and/or SURF during installation of material 100.

When incorporated on mount surface 125, the mount surface adhesive 135 may integrally incorporate the contemplated unmagnetized ferromagnetic and/or ferromagnetic material 127, and may be further configured as at least one of a pressure and/or heat activated adhesive 135, which may be formulated, modified, and/or configured to be partially tacky and releasable. This enables repositioning, alignment, and rearrangement during application and installation of erasable writable material 100, and until mount surface adhesive 135 is at least one of pressure and/or heat activated. A number of suppliers offer various polyvinyl film and sheet materials that can be modified according to the disclosure, and include for example the 3M Corporation, Maplewood, Minn., USA (www.3m.com), Dupont Corporation, Wilmington, Del., USA (www.dupont.com), among others.

In further variations, repositioning capabilities may be additionally enabled on mount surface 125 and/or with adhesive 135, which may also include, incorporate, and/or be configured with a plurality of air channels 140, which are or may be formed by at least one of patterns of striations, grooves, furrows, keyways, and/or recesses 145 that may enable passage of air therethrough and that may be in some adaptations be substantially parallel along a selected direction of mount surface 125 and/or adhesive 135, and which channels 140 are formed integral with or on mount surface 125 and/or adhesive 135.

In further modifications, air channels 140 and/or mount surface adhesive 135 further includes a plurality of frangible hollow pockets, spheres, nodules, and/or other similarly capable elements 150 spread or dispersed about mount surface 125 and/or throughout mount surface adhesive 135. Such elements 150 may be sized to function as temporary supports between mount surface 125, adhesive 135, and/or large format surface SURF during and enabling improved and easier installation, repositioning, alignment, and/or rearrangement. In any of such configurations, air channels 140 remain intact during installation, repositioning, and alignment upon surface SURF, and thereafter collapse when mount surface 125 is applied to large format surface SURF by application of heat and/or pressure and activation of mount surface adhesive 135.

Collapse of and/or filling of air channels 140 is and/or may be enabled by the application of pressure and/or heat to sheet or film carrier or substrate 120, which is sufficient to cause one or more of mount surface adhesive 135 to fill channels and/or striations 145, and/or hollow elements 150 to be broken in response to one or more of the application of pressure and/or heat and/or activation of adhesive 135. Such collapse of air channels 140 may be apparent to those having skill in the relevant technology with reference specifically to FIG. 3, which schematic depicts erasable writable material 100 installed against surface SURF, and having only mount surface adhesive 135 shown, since air channels 140 are represented here as having been collapsed and subsumed as part of adhesive 135, as compared to channels 140 being visible in FIG. 2 in the illustration of the assembled but uninstalled erasable writable material 100.

The disclosure further contemplates receiver surface 130 being configured, treated, and/or adjusted to be etched and/or micro-etched to increase surface area and to increase a surface energy thereof to exceed about 38 to about 45 millinewtons per meter (mN/m). The increased surface area and surface energy in turn increases and improves the receptivity and capability of receiver surface 130 to receive, mount, adhere, and/or carry graphic elements 155 that can be printable and/or printed on receiver surface 130, as well as preformed graphic elements 160, either and/or both of which can include for purposes of example without limitation visual media such as images and/or designs and many other elements.

Such printable and/or printed graphic elements 155 as well as preformed graphic elements 160, for further examples, may be and/or include large format images, photographs, designs, logos, trademarks, symbols, and written words, among other types of elements 155. The preformed graphic elements 160 may also further include and/or incorporate cut symbols, designs, lettering, and the like that can be adhered to etched receiver surface 130. For purposes of printed and printable graphic elements 155, it has been observed that an optimum surface energy of receiver surface 130 should exceed by about 10 mN/m, the surface energy of the print ink, toner, or other print media, to improve receptivity thereof onto receiver surface 130.

As contemplated here, surface energy may be established and measured according to a number of possible standards and procedures, which for example may include ASTM D6105-04(2012), entitled "Standard Practice for Application of Electrical Discharge Surface Treatment (Activation) of Plastics for Adhesive Bonding," among other industry accepted practices. Many suppliers are available that offer such surface energy/tension measurement technology and include dyne pens and wetting solutions available from, for further example, TanTec A/S of Denmark and Germany (tantec.com), and Dyne Technology Ltd. of Staffordshire, United Kingdom (www.dynetechnology.co.uk), among others.

Here, for additional illustration purposes but not limitation, various inks such as water and solvent soluble inks, gel inks, latex inks, and/or ultraviolet or UV curable inks are contemplated, such that receiver surface 130 should be configured to have a surface energy exceeding about 38 mN/m. In further examples where preformed graphic elements 160 are to be adhered to receiver surface 130, it has been observed that good results are also obtained at energies exceeding about 38 mN/m, but that further improved adhesion of preformed graphic elements 160 is obtained when surface energy of receiver surface 130 is increased to approximately exceed about 45 mN/m. Various types of such UV curable inks are available from various printer and ink suppliers, and include for example, Roland DGA Corporation, Irvine, Calif., USA (www.rolanddga.com), among others.

Throughout this description, "approximately exceed" is in one example, for purposes of illustration without limitation, intended to mean approximately exceed a value between: 35 mN/m and 55 mN/m or in another example, about 40 mN/m and 50 mN/m, or in still other exemplary arrangements, about 42 mN/m and 48 mN/m. The phrase "approximately exceed" is also in other examples of exemplary arrangements of this description, for purposes of example without limitation, interpreted to mean, define, and exemplify manufacturing, fabrication, and/or measurement tolerances that range approximately between 1% and 10% or more or less of the specified parameters and according to end use and quality assurance requirements.

The disclosure contemplates a number of such surface energy adjustment and modification treatments that can configure, adjust, and/or modify surface energy of receiver surface 130, which include for further example, chemical primer, mechanical abrasion, high-frequency electrical corona discharge, flame plasma, atmospheric plasma, and/or ultraviolet radiation ozone treatment. For purposes of further example without limitation, receiver surface 130 was treated with a flame plasma treatment method after cast manufacturing, which enabled satisfactory micro-etching to increase surface area, and also an increased surface energy of receiver surface 130, which approximately exceeded 45 mN/m, and which surface energy is imparted to dwell for a long enough time after treatment and modification to enable subsequent shipping, storage, and eventual fabrication of the assembled erasable writable material 100, to include printed graphic elements 155 and preformed graphic elements 160.

In some configurations and during experimentation with varying arrangements of receiver surface 130 of film or sheet carrier or substrate 120, it has been found that imparting micro-etching and surface energy treatments that cause post-manufacturing surface energy that approximately and substantially exceeded between about 45 and 60 mN/m or so and depending upon initial configurations and conditions, can enable sufficient dwell time for shipping, storage, and fabrication of the assembled erasable writable material 100 such that natural relaxation of the surface energy results a satisfactory surface energy that substantially exceeds about 45 mN/m with a tolerance of approximately zero to an added 1, 2, 3, or 5 mN/m or so, as measured during end-use fabrication and utilization of material 100.

Throughout this description, "substantially exceed(s)" is also in other examples of exemplary arrangements of this description, for purposes of example without limitation, interpreted to mean, define, and exemplify manufacturing, fabrication, and/or measurement tolerances that range between about 1% and 10% or more or less of the specified parameters and according to end use and quality assurance requirements. Various types of flame plasma equipment is available that enables the modification, adjustment, configuration, and treatments described herein, which are configured to adjust temperature, distance to material being treated, and material flow through speed, among other parameters. Such equipment, material, and substances are also available for chemical priming, ozone, electrical discharge corona, and related treatments. Such flame plasma and other equipment is available from, for purposes of example without limitation, Enercon Industries Corporation, Menomonee Falls, Wis., USA (www.enerconind.com), and Plasma Technology Systems, Elgin, Ill., USA (www.plasmatechsystems.com), among many others.

With continuing reference to FIGS. 1, 2, and 3, erasable writable magnetic material 100 also includes and/or may include a visually transparent and flexible polyester sheet and/or film 165, which is joined to the polyvinyl sheet or film carrier or substrate 120 as described elsewhere herein. A number of polyesters are known to those knowledgeable in the technology and may include for exemplary illustration purposes, a polyethylene terephthalate (PET) film or sheet material. Among others, both the 3M Corporation and Dupont Corporation offer a number of polyester and PET sheet and film materials that can be modified according to the disclosure to enable the capabilities described herein of erasable writable magnetic material 100.

The polyester sheet and/or film 165 is formed with and includes a marking side 170 and an opposite seal side 175. Marking side 170 is configured and/or modified to have a hardness that enables durability during use after installation of magnetic erasable writable material 100. More specifically, marking side 170, and/or the sheet/film 165, is mechanically, chemically, and/or physically configured, adjusted, and/or modified to have a durometer hardness that approximately exceeds 79 on the Shore D durometer hardness scale, wherein "approximately exceeds" is used throughout this description and defined herein to mean a spectrum of hardness fabrication and manufacturing and/or measurement tolerances that vary on the Shore D scale of between about zero and 1, 2, 3, and about 10 or so, such that "approximately exceeds 79" in an example interpretation for purposes of illustration without limitation, can be understood to mean between about 69 and 89 or between about 76 and 82 or other ranges depending upon end use and quality assurance requirements.

Many types of durometer test equipment are available from a variety of suppliers, and include for example, Hoto-Instruments of Northbrook, Ill., USA (hoto-instruments-.com). Various industry standards are available for establishing durometer hardnesses and tolerances, and include for example and among others, ASTM D785-08(2015), entitled "Standard Test Method for Rockwell Hardness of Plastics and Electrical Insulating Materials," and ASTM D2240-15, entitled "Standard Test Method for Rubber Property-Durometer Hardness."

As some skilled in the relevant fields of technology may understand, the hardness of a material may be heterogeneous and/or homogenous throughout the volume of the material, and/or is or may be isolated to certain regions, surfaces, and/or portions according to manufacturing methods as well as according to design intentions. For example, for purposes of the disclosure, the polyester material may be configured with, incorporate, modified, and/or adjusted to have varying hardness(es) that are and/or may be incorporated about the entire thickness of the polyester sheet or film, and/or primarily about one or both surfaces, such as about marking side 170.

In further examples, the hardness homogeneity of the polyester sheet or film 165 as well as marking side 170 is manufactured, treated, configured, and/or modified to incorporate the hardness approximately exceeding shore D 79, by adjusting a raw material formulation and fabrication method generally known to those skilled in the technology. In additional modifications, polyester sheet or film 165, such as the polyester and/or PET film 165, is manufactured or configured to have a thickness of approximately 50 micromillimeters or microns, which in addition to the chemistry and formulation of sheet/film 165, enables the durometer measured hardness to approximately exceed 80 on the Shore D durometer scale, and in other variations and modifications as described elsewhere herein, to approximately exceed Shore D 88, 90, and/or 95 hardnesses.

Seal side 175 is and/or may treated, adjusted, and/or configured to have a surface energy that exceeds approximately or about 45 mN/m, by utilizing any of the methods described elsewhere including for example without limitation flame plasma treatment methods. Further, seal 175 in other variations of polyester film 165 includes a seal side adhesive 180 that is applied, and which may also be at least one of heat and pressure activated. A release liner similar to that shown elsewhere herein may also be used to protect seal side adhesive 180 prior to assembly and fabrication of erasable writable magnetic material 100.

Seal side adhesive 180 enables lamination and joining to receiver surface 130, utilizing one or more of a predetermined heat, pressure, and rolling lamination speed, such that graphic elements 155, 160 are encapsulated and/or hermetically sealed between seal side 175 and against receiver surface 130 during fabrication of erasable writable material 100. Lamination and/or joining and encapsulating of graphic elements 155, 160 is accomplished utilizing the predetermined heat, pressure, and rolling lamination speed utilizing one or more readily available and partially or wholly automated devices, such as, for purposes of example without constraints, a Kala™ Mistral 1650 or 2100 laminating machine, available from Kala Finishing Systems, Nouvoitou, France (kala.fr), among others.

The erasable writable material 100 is also further directed to marking side 170 of polyester sheet or film including, incorporating, being modified or formed with or by, being coated with, and/or being joined to a clear superstrate 185. Superstrate 185 is formulated, treated, selected, and/or configured to additionally augment and/or increase the hardness of marking side 170, such that marking side 170 subsequently has a durometer hardness that approximately exceeds a durometer of 80 on the Shore D durometer scale, or higher, and that in additional variations approximately exceeds 88, 90, and/or 95 on the Shore D scale.

Superstrate 185 is typically applied to marking side 170 of polyester sheet/film 165, and is chemically formulated and/or selected to lower the surface energy of marking side 170 from an average, typical post-manufacture surface energy of about between 40 and 45 MN/m, to be approximately between 15 and 30 mN/m, and/or below about 24 mN/m. As with this and prior arrangements, implementations, and examples, "approximately between" and "below about" should be understood by those skilled in the art to mean a nominal material, chemical, manufacturing, fabrication, and/or measurement tolerance of between about zero and 1, 2, 3, 5, and/or higher tolerance magnitudes, which depends upon material and environmental initial conditions and mechanical, chemical, and other physical properties of the materials and manufacturing equipment and operating conditions.

The intentionally decreased surface energy in combination with the increased hardness, enables improved resilience against harsh cleaning agents. The higher hardness and lowered surface energy of the combined marking side 170 and superstrate 185, also has demonstrated improved resistance against marking substances, such as permanent and non-permanent erasable marking substances, which may be applied to marking side 170.

Consequently, the combined hardness and surface energy of superstrate 185 and marking side 170 enables substantially improved prevention against the persistent problem of staining and ghosting, even when such marking substances remain on marking side 170 for extended periods of time beyond a day or week. Currently available products often advertise anti-stain and anti-ghosting capability, but require daily or frequent cleaning to avoid migration and permeation of pigments from such marking substances into the marking side substrate.

In further enabling examples, superstrate 185 includes at least one of and/or one or more of constituents such as a perfluoropolyether, a polyurethane, an acrylated polyurethane, and/or an acrylate resin that is hardenable and/or may be hardened after application to and/or coating of marking side 170. Superstrate 185 is formulated, configured, treated, adjusted, and/or modified with such constituents to have a durometer hardness when cured that exceeds approximately 80 to 95 on the Shore D scale. In further configurations, superstrate 185 additionally includes a photoinitiator that is responsive to ultraviolet radiation, which enables curing and hardening of superstrate 185 after application to, incorporation with, coating of, and/or joining of superstrate 185 to marking side 170 of polyester sheet/film 165. These arrangements of superstrate 185 enable further hardening of marking side 170.

In further variations, the disclosure contemplates superstrate 185 being applied, configured, adjusted, and/or modified to have a thickness, when applied, adhered, and/or joined to marking side 170 of polyester sheet or film 165, of approximately between 2 and 5 microns. Here too, "approximately between" is intended to mean between about 2 and 5 microns according to nominal material, manufacturing, and/or measurement tolerances, which in exemplary arrangements of this description, for purposes of example without limitation, can be interpreted to mean tolerances that range between about 1% and 10% or more or less of specified magnitudes and/or dimensions, and according to end use and quality assurance requirements. In combination with the selection, adjustment, configuration, and/or formulation of superstrate material(s) and constituents 185, this enables the desired durometer hardness of combined marking side 170 and superstrate 185 to exceed about shore D 88, 90, and/or 95 hardnesses.

Superstrate 185 is also configured, selected, adjusted, modified, and/or chemically formulated, when joined to polyester film 165, to have a maximum optical light transmission and minimum optical haze. For purposes of example without limitation, more specifically, Superstrate 185 is adjusted, configured, and/or formulated to have a visible light transmission of greater than about 90% of the visible light that is incident upon the superstrate. Superstrate 185 is also adapted, adjusted, configured, and/or formulated to have a haze, or wide angle light scattering or diffusive effect that does not exceed about 0.6% or so, as determined by spectrophotometric measurements, and according to various standard test methods and material and measurement tolerances. Such configurations of superstrate 185 in combination with the other elements and capabilities of erasable writable material 100 enable an improved marking side 170 with increased durability and resilience for dry-erase and related activities.

One such suitable test method for superstrate 185 may include, for example without limitation, ASTM D1003-13, entitled "Standard Test Method for Haze and Luminous Transmittance of Transparent Plastics." A number of manufacturers have available various types of substances and materials that may meet at least one of such capabilities of superstrate 185, and if further modified according to the capabilities described herein, may be suitable for purposes of the disclosure. Exemplary constituents and materials suitable for modification and subsequent manufacturing of superstrate 185, for purposes of example, include Optool™ DAC-HP available from Daikin Industries, Ltd., Osaka, Japan (daikin.com), and OC-3021 Hard Coating and UV curing equipment available from Dymax Corporation, Torrington, Conn., USA (www.dymax.com).

The magnetic erasable writable material 100 is further directed to including a release liner 190 that may be included to protect the adhesives described elsewhere herein. For example, release liner 190 may be utilized, for purposes of example but not to limit the described capabilities, to temporarily protect mount surface adhesive 135 (illustrated in FIGS. 1, 2, and 3) and/or seal side adhesive 180 (not shown but similarly arranged). Release liner 190 may further include materials and substances that improve performance and prevent degradation of the adhesives 135, 180 prior to and during fabrication of erasable writable magnetic material 100.

Such materials and substances may include for example without limitation a polyethylene layer and/or coating 192 that has been treated with silicone 195 to be siliconized, such that removal of release liner 190 from the adhesives 135, 180 does not degrade, disrupt, and/or change the properties of the adhesives 135, 180. Such releasability of release liner 190 is enabled by being coated with the siliconized polyethylene 192, which has been demonstrated to reduce surface energy of release liner 190 to approximately between 24 and 33 mN/m, which prevents permanent adhesion between the adhesives 135, 180, and release liner 190.

Release liner 190 can be thereby configured to protect material 100, seal side adhesive 180, and to overlay and protect mount surface 125 and/or mount surface adhesive 135 and air channels 140 during fabrication, shipment, storage, and until installation and application of erasable writable material 100 to a surface SURF. Many suitable types of release liners 190 are available in the described configuration and for example include those available from 3M Corporation and Laufenberg GmbH, Krefeld-Hüls, Germany (www.laufenberg.info), and others, which manufacture what are typically referred to by those having knowledge in the field as Kraft paper release liners that are suitable for purposes of the disclosure.

Figure 4:
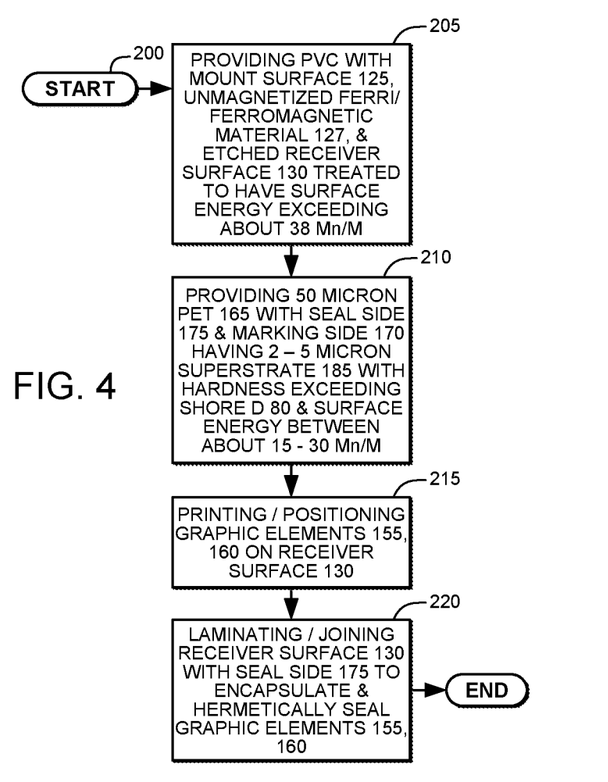
FIG. 4 describes aspects of the disclosure directed to fabrication of the erasable writeable material.

With continuing reference to the various figures and preceding descriptions, and now also to FIG. 4, methods of manufacturing magnetic erasable writable material 100 are also described starting at step 200. For example, providing at step 205 calendared and/or cast the vinyl and/or polyvinylchloride film 120 with unmagnetized ferromagnetic and/or ferromagnetic material 127 and with mount surface 125 opposite etched receiver surface 130 that has been treated to have a receiver surface energy increased to exceed approximately 38 millinewtons per meter (mN/m), to increase adherence of one or more of printed and preformed graphic elements 155, 160.

At step 210, a transparent polyethylene terephthalate (PET) sheet or film 165 is provided that includes a seal side 175 and an opposite marking side 170 that has a hardness exceeding approximately shore D 79. Additionally, treating, formulating, configuring, adjusting, and/or modifying marking side 170 is also included by application and/or incorporation of superstrate 185, such that a hardness exceeding approximately shore D 90 is enabled, and a surface energy of the marking side is lowered below about 24 mN/m.

Further variations of the methods incorporate configuring PET sheet or film 165 to have a thickness of approximately 50 microns to enable the hardness exceeding about shore D 79, and configuring superstrate 185 to have a thickness of approximately between 2 and 5 microns to enable the approximately greater than shore D 80 hardness, and such that surface energy of marking side 170 is reduced, adjusted, configured, and/or lowered to approximately between 15 and 30 mN/m to increase resilience and durability of marking side 170, and the also increase fugitivity of and prevent ghosting and staining by non-permanent and permanent marking substances applied to marking side 170.

The disclosure also includes the methods to incorporate applying adhesive 180 to seal side 175 of polyester/PET sheet or film 165 to enable hermetic lamination to receiver surface 130 utilizing one or more of a predetermined heat, pressure, and rolling lamination speed. The methods also include variations that include forming superstrate 185 to include the UV radiation responsive photoinitiator, and one or more of the polyurethane, acrylated polyurethane, acrylate resin, and perfluoropolyether, which in combination enable the hardness and reduced surface energy when irradiated with the UV radiation.

In other arrangements of the methods, configuring the superstrate 185 includes incorporating an ultraviolet radiation responsive photoinitiator, and at least one of a perfluoropolyether, a polyurethane, an acrylated polyurethane, and an acrylate resin, and irradiating the photoinitiator with ultraviolet radiation to harden superstrate 185. The methods are also directed to treating the polyvinylchloride and/or PET film 165 to be configured to have surface energy of receiver surface 130 increased to exceed approximately 38 mN/m, to increase adherence of one or more of printed and preformed graphic elements 155, 160.

The methods at step 215 further include at least one of printing and positioning graphic elements 155, 160 on etched receiver surface 130. At step 220, laminating and/or joining seal side 175 to etched receiver surface 130 is accomplished to encapsulate and hermetically seal graphic elements 155, 160 between receiver surface 130 and seal side 175.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An erasable writable material, comprising:
   a vinyl film formed to have opposite sided mount and etched receiver surfaces, the mount surface having a ferromagnetic material;

a polyester film exceeding a first predetermined hardness and having opposite seal and marking sides, the seal side affixed to the receiver surface; and a superstrate exceeding a second predetermined hardness, joined to the marking side and lowering its surface energy.

2. The erasable writable material according to claim 1, comprising:

the vinyl film formed from a polyvinylchloride that incorporates the ferromagnetic material;

the polyester film formed from polyethylene terephthalate (PET); and the superstrate formed from one or more of an acrylate, a polyurethane, and an acrylated polyurethane.

3. The erasable writable material according to claim 1, comprising:

the receiver surface adhered with one or more of graphic elements; and the polyester film including an adhesive applied to the seal side that is configured to enable joining to the receiver surface utilizing one or more of a predetermined heat, pressure, and rolling lamination speed, such that the graphic elements are hermetically sealed against the receiver surface.

4. The erasable writable material according to claim 1, comprising:

the receiver surface being micro-etched and treated to increase its surface energy to a first value before adhering of the graphic elements, and to a second value higher than the first value before lamination of the polyester film, by one or more of a corona discharge, primer, chemical, ozone, flame plasma, and atmospheric plasma treatment.

5. The erasable writable material according to claim 1, comprising:

the ferromagnetic material formed from one or more of powder, particles, filings, and shavings.

6. The erasable writable material according to claim 1, comprising:

the ferromagnetic material formed from unmagnetized powder, particles, filings, and shavings.

7. The erasable writable material according to claim 1, comprising:

the mount surface incorporating a pressure and heat activated adhesive that incorporates the ferromagnetic material; and a release liner removably affixed to the mount surface adhesive, and being coated with a polyethylene that is siliconized to reduce surface energy to enable adherence of the liner to the mount surface adhesive without degradation of the mount surface adhesive.

8. The erasable writable material according to claim 1, comprising:

the ferromagnetic material having predetermined respective permeability and coercivity ranges.

9. The erasable writable material according to claim 1, comprising:

the ferromagnetic material being unmagnetized and having predetermined respective permeability and coercivity ranges.

10. The erasable writable material according to claim 1, comprising:

the vinyl film formed from cast polyvinylchloride and configured to have the receiver surface etched and configured to have a preferred surface energy;

the polyester film formed from polyethylene terephthalate (PET) with adhesive applied to the seal side that is at least one of heat and pressure activated to enable lamination to the receiver surface; and the superstrate including an ultraviolet radiation responsive photoinitiator, and configured with a predetermined cured hardness and a surface energy of the marking side reduced below a predetermined range.

11. An erasable writable material, comprising:

a flexible cast polyvinylchloride film with an etched receiver surface opposite a mount surface carrying ferromagnetic material;

a transparent polyethylene terephthalate film having a marking side with a first predetermined hardness and an opposite seal side joined to the receiver surface; and a clear superstrate having a second predetermined hardness, and joined to the marking side such that its surface energy is lowered.

12. The material to claim 11, comprising:

the mount surface incorporating an adhesive that incorporates the ferromagnetic material; and the receiver surface formed with a preferred surface energy and carrying graphic elements.

13. The material according to claim 11, comprising:

the polyethylene terephthalate film configured with a thickness established to enable the first predetermined hardness;

the superstrate configured to have a thickness establishing the second predetermined hardness, and configured with the marking side surface energy reduced such that fugitivity is increased to prevent staining by applied marking substances.

14. The material according to claim 13, comprising:

the superstrate including one or more of:

an ultraviolet radiation responsive photoinitiator;

at least one of a perfluoropolyether, a polyurethane, an acrylated polyurethane, and an acrylate resin; and such that the superstrate is configured with a predetermined cured hardness and a reduced surface energy of the marking side.

15. The material according to claim 11, comprising:

the polyvinylchloride film incorporating the ferromagnetic material and configured to have a receiver surface energy that increases adherence of graphic elements carried thereon;

the polyethylene terephthalate film including an adhesive applied to the seal side to join with the receiver surface responsive to one or more of a predetermined heat, pressure, and rolling lamination speed; and the superstrate including an ultraviolet radiation responsive photoinitiator and formed from a material that enables the hardness and reduced surface energy.

16. A method of manufacturing an erasable writable material, comprising:

providing a first flexible film with opposite mount and etched receiver surfaces, the mount surface incorporating a ferromagnetic material;

joining to the receiver surface a seal side of a second flexible film having an opposite marking side with a first predetermined hardness; and applying a superstrate to the marking side that is hardened to a second predetermined hardness and a predetermined surface energy.

17. The method according to claim 16, comprising:

configuring the second flexible film to have a first thickness that enables the first predetermined hardness; and configuring the superstrate to have a thickness establishing the second predetermined hardness, and wherein marking side surface energy is reduced to increase fugitivity of and prevent staining by applied marking substances.

18. The method according to claim 16, comprising:

providing the mount surface with an adhesive that incorporates the ferromagnetic material;

providing the superstrate to include at least one of polymer and a resin and an ultraviolet radiation responsive photoinitiator that is irradiated therewith to harden the superstrate.

19. The method according to claim 16, comprising:

providing the mount surface with at least one of a pressure and heat activated adhesive incorporating the ferromagnetic material;

providing the first flexible film to have the ferromagnetic material and configured with a receiver surface energy enabling adherence of graphic elements about the mount surface; and providing the graphic elements to be sealed between the receiver surface and the seal side.

20. The method according to claim 16, comprising:

applying an adhesive to the seal side to enable lamination to the receiver surface utilizing one or more of a predetermined heat, pressure, and rolling lamination speed; and forming the superstrate to include an ultraviolet radiation responsive photoinitiator configured to enable the hardness and reduced surface energy when irradiated with the ultraviolet radiation.

* * * * *